(12) United States Patent
Wu et al.

(10) Patent No.: US 8,040,696 B2
(45) Date of Patent: Oct. 18, 2011

(54) RESONANT CONVERTER SYSTEM HAVING SYNCHRONOUS CONTROL CIRCUIT AND CONTROLLING METHOD THEREOF

(75) Inventors: Hongyang Wu, Shanghai (CN); Bin Wang, Shanghai (CN); Jianhong Zeng, Shanghai (CN); Jianping Ying, Shanghai (CN); Xiaoni Xin, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 553 days.

(21) Appl. No.: 12/250,146

(22) Filed: Oct. 13, 2008

(65) Prior Publication Data
US 2009/0097280 A1  Apr. 16, 2009

(30) Foreign Application Priority Data
Oct. 16, 2007 (TW) .............................. 96138760 A

(51) Int. Cl.
*H02M 3/335* (2006.01)
*H02M 7/217* (2006.01)
(52) U.S. Cl. ............... 363/21.02; 363/21.06; 363/21.14; 363/127
(58) Field of Classification Search .............. 363/17, 363/21.02, 21.03, 21.06, 21.14, 97, 98, 127, 363/132
See application file for complete search history.

(56) References Cited

U.S. PATENT DOCUMENTS

| | | | | |
|---|---|---|---|---|
| 4,866,592 | A * | 9/1989 | Fujii et al. | 363/98 |
| 5,956,245 | A * | 9/1999 | Rozman | 363/89 |
| 6,009,007 | A * | 12/1999 | Pan | 363/98 |
| 6,934,167 | B2 * | 8/2005 | Jang et al. | 363/21.02 |
| 6,940,738 | B2 * | 9/2005 | Huang et al. | 363/127 |
| 6,961,253 | B1 * | 11/2005 | Cohen | 363/89 |
| 7,408,796 | B2 * | 8/2008 | Soldano | 363/127 |
| 7,636,249 | B2 * | 12/2009 | Hu | 363/127 |
| 7,660,135 | B2 * | 2/2010 | Fang | 363/17 |
| 7,843,707 | B2 * | 11/2010 | Chen et al. | 363/17 |
| 2003/0081433 | A1 * | 5/2003 | Itakura et al. | 363/21.06 |

FOREIGN PATENT DOCUMENTS

JP    2007-274789    * 10/2007

OTHER PUBLICATIONS

Adnan Lokhandwala, Maurizio Salato, and Marco Soldano; Dual SmartRectifier and DirectFETÂ® Chipset Overcomes Package Source Inductance Effects and Provides Accurate Sensing for Synchronous Rectification in DC-DC Resonant Converters; Feb.-Mar. 2007; IEEE Xplore; Applied Power Electronics Conference, APEC 2007—Twenty Second Annual IEEE;1559-62.*

* cited by examiner

*Primary Examiner* — Gary L Laxton
*Assistant Examiner* — Zekre Tsehaye
(74) *Attorney, Agent, or Firm* — Volpe and Koenig, P.C.

(57) ABSTRACT

The configurations of a resonant converter system and a controlling method thereof are provided. The proposed resonant converter system includes a resonant converter receiving an input voltage for outputting an output voltage, a rectifying device having a first rectifying switch and a synchronous rectification control circuit coupled to the resonant converter and including a signal generation apparatus generating a weighted turn-off signal to turn off the first rectifying switch at a zero crossing point of a first current flowing through the first rectifying switch.

20 Claims, 14 Drawing Sheets

RESONANT CONVERTER SYSTEM HAVING SYNCHRONOUS CONTROL CIRCUIT AND CONTROLLING METHOD THEREOF

FIELD OF THE INVENTION

The present invention relates to a resonant converter system. More particularly, the present invention relates to a resonant converter system having a synchronous rectification control circuit.

BACKGROUND OF THE INVENTION

Due to that the power density of the power supply and the efficiency of the circuit are continuously increased, the resonant converters are becoming more and more valued for their relatively higher efficiencies and the synchronous rectification technology are commonly applied due to its relatively lower turn-on loss.

But there are certain problems regarding using the synchronous rectification technology in the resonant converters. These problems are addressed by using FIGS. 1 to 5 as examples. As shown in FIG. 1, it is a circuit diagram of a DC/DC full-bridge LLC resonant converter 10 in the prior art. In which, it receives an input voltage Vin for generating an output voltage Vout, and includes an input capacitor C1, a full-bridge switching circuit having four switching switches (Q1-Q4), a resonant tank having a resonant inductor Lr, a resonant capacitor Cr and a magnetizing inductor Lm, wherein these three elements are coupled to each other in series, a transformer T having a primary winding and a secondary winding with a central tap, a full-wave rectifier having two rectifying switches (Q5-Q6) and an output capacitor C2. FIG. 2 shows the main operating waveforms of the DC/DC full-bridge LLC resonant converter as shown in FIG. 1. In which, $V_{Q1}$, $V_{Q4}$, $V_{Q2}$ and $V_{Q3}$ are gate driving signals of the four switching switches Q1, Q4, Q2 and Q3 respectively; $i_{Lm}$ is the waveform of the magnetizing current; $i_{Lr}$ is the waveform of the resonant current; $i_{Q5}$ and $i_{Q6}$ are the current waveforms of the rectifying switches Q5 and Q6 of the secondary side of the transformer, which are approximate to the sine waveform when Q5 and Q6 are turned on; $V_{Q5}$ and $V_{Q6}$ are gate driving signals of the ideal rectifying switches Q5 and Q6, wherein the falling edges of the two gate driving signals $V_{Q5}$ and $V_{Q6}$ are guaranteed that Q5 and Q6 are turned off at the zero current crossing timing point that is—the timing point that their currents are crossing zero point towards the negative direction. Viewing from FIG. 2, there are no direct corresponding relationships among $V_{Q5}/V_{Q6}$, and gate driving signals $V_{Q1}$, $V_{Q4}$, $V_{Q2}$ and $V_{Q3}$, thus $V_{Q5}/V_{Q6}$ can not be simply composed by using the primary side driving signals $V_{Q1}$, $V_{Q4}$, $V_{Q2}$ and $V_{Q3}$, which results in the complexity of the synchronous rectification of the resonant converter.

There are plenty of controlling methods for the resonant converters, one of which is the current sensing controlling method. In FIG. 3, it is a schematic circuit diagram of a DC/DC full-bridge LLC resonant converter system having a synchronous rectification controller in the prior art, which utilizes a zero current crossing comparing and controlling method to obtain the synchronous rectification control. Except for the DC/DC full-bridge LLC resonant converter 10, it further includes a first and a second synchronous rectification controller 11 and 12 and a main controller 13 at the primary side of the transformer T. Since the controlling principles and the structures of the first and the second synchronous rectification controllers 11 and 12 are all the same, the controlling principle and the structure of the second synchronous rectification controller 12 is described as an example. In this controlling method, a turn-on current signal $V_{C6}$ of the rectifying switch Q6 representing the turn-on current of Q6 is generated via a current transformer (CT) 120 and a current sensor 121 firstly. The turn-on current signal $V_{C6}$ compares with a reference voltage Vref (Vref=0) via a comparator 122 to obtain a zero crossing signal $V_{Cm6}$ wherein the timing of the falling edge of $V_{Cm6}$ is the same as zero current crossing point that is the timing point when $V_{C6}$ equals to 0. Then the zero crossing signal $V_{Cm6}$ goes through a processor 123 and a driver 124 to generate the driving signal $V_{Q6}$ to drive the switch Q6, wherein when $V_{Cm6}$ goes through the processor 123, it engages a series of processes regarding preventing from jitter and reshaping etc. And the first synchronous rectification controller 11 and the second synchronous rectification controller 12 have the same elements, i.e. a CT, a current sensor, a comparator, a processor and a driver, wherein a turn-on current signal of the rectifying switch Q5 is $V_{C5}$, and a zero crossing signal $V_{Cm5}$ is obtained by sending $V_{C5}$ through its comparator (which are not shown). The driver of the first synchronous rectification controller 11 generates the driving signal $V_{Q5}$ to drive the switch Q5. And the main controller 13 generates a first driving signal (which includes gate driving signals $V_{Q1}$ and $V_{Q4}$) to drive the first and the fourth switches Q1 and Q4 and a second driving signal (which includes gate driving signals $V_{Q2}$ and $V_{Q3}$) to drive the second and the third switches Q2 and Q3. As shown in FIG. 3, the method for sensing the current is to sense the current of the rectifying switch directly through the CT, and there are many other current sampling methods in actual applications, e.g., sensing the switch current via a resistor connected in series with the switch, directly sensing the voltage across two terminals of the switch or sensing a signal in the circuit reflecting the switch current e.g. the primary side current of the transformer which omitting a portion related to the magnetizing current.

This kind of zero crossing comparing and controlling method has simple principles and is easy to accomplish. But there is propagation delay in the circuit so that when the turn-on current equals to zero and even less than zero, $V_{Q6}$ is still on high level which means Q6 is still on, thus a current reverse-flow phenomenon occurs and a relatively large voltage spike across the corresponding rectifying switch generates. One solution is to increase the comparison threshold value Vref of the comparator 122 such that the timing of the falling edge of the turn-off signal $V_{Cm6}$ is a little bit earlier than the zero current crossing point to counteract the propagation delay. Similarly, the same problem exists in the control method for the rectifying switch Q5 driven by the first synchronous rectification controller 11, and can be solved by the same method. FIG. 4 shows corresponding waveforms of the resonant converter system in FIG. 3. Comparing the non-zero comparison threshold value Vref with the synchronous rectifying switches' turn-on current signals $V_{C5}$ and $V_{C6}$ to obtain turn-off signals $V_{Cm5}$ and $V_{Cm6}$ whose falling edge are a little bit earlier than the zero current crossing point that the current signals $V_{C5}$ and $V_{C6}$ equals to zero from the positive direction such that the rectifying switches Q5 and Q6 are turned off when the current is at the zero as shown by the waveforms of $V_{Q5}$ and $V_{Q6}$ in FIG. 4.

But, this method also has its problems. For different loads, the delay time between the falling edge of the turn-off signal and zero current crossing point are not the same due to the variations of the rectifying currents' waveforms. As shown in FIG. 5, the sampling current signals $V_{C5a}$ ($V_{C6a}$) and $V_{C5b}$ ($V_{C6b}$) are different when the loads are different, which results in the falling edges of the driving signals $V_{Q5a}$ and $V_{Q6a}$ generated by comparing the large current signals $V_{C5a}$ and $V_{C6a}$ with the comparison threshold value Vref lagged than the falling edges of the driving signals $V_{Q5b}$ and $V_{Q6b}$ generated by comparing the small current signals $V_{C5b}$ and $V_{C6b}$ with the comparison threshold value Vref. Thus, if the threshold value suitable for the heavy load circumstances is employed at light load condition, the falling edges of the driving signals $V_{Q5b}$ and $V_{Q6b}$ are early than the zero crossing point and part of the current flows through the parasite diodes of the rectifying switches Q5 and Q6, thus the efficiency is decreased. Similarly, if the threshold value suitable for the light load circumstances is employed at heavy load condition, the falling edges of the driving signals $V_{Q5a}$ and $V_{Q6a}$ are latter than the zero crossing point and the current flows reversely, thus the voltage spike of the rectifying switches Q5 and Q6 are generated.

Thus, the best method is to employ an adaptive comparison threshold value for different load current to make sure that the falling edge of the driving signal of the synchronous rectifying switch is at the same timing point e.g. the zero current crossing point at different load condition. The present invention is proposed according to such an idea.

Keeping the drawbacks of the prior arts in mind, and employing experiments and research full-heartily and persistently, the applicant finally conceived a resonant converter system having a synchronous rectification control circuit and a controlling method thereof.

SUMMARY OF THE INVENTION

It is therefore an object of the present invention to provide a resonant converter system having a synchronous rectification control circuit such that a different comparison threshold value is used for each different load current to make sure that the falling edge of the driving signal of the synchronous rectifying switch reaches and turns off the rectifying switch at zero crossing point of the current after going through the driving circuit so as to have a relatively lower loss.

According to the first aspect of the present invention, a resonant converter system includes a resonant converter receiving an input voltage for outputting an output voltage, a rectifying device having a first rectifying switch and a synchronous rectification control circuit coupled to the resonant converter and including a signal generation apparatus generating a weighted turn-off signal to turn off the first rectifying switch, wherein the weighted turn-off signal is generated by comparing a sensed value of a first current flowing through the first rectifying switch, a reflection signal reflecting a peak value of the first current and a reference voltage.

Preferably, the weighted turn-off signal is used to turn off the first rectifying switch at a zero crossing point of the first current.

Preferably, the signal generation apparatus includes a first weight generator having a first input terminal receiving the reflection signal reflecting the peak value of the first current, a second input terminal receiving the reference voltage and an output terminal generating a weighted comparison voltage, wherein the weighted comparison voltage is a weighted sum of the reflection signal and the reference voltage, a second weight generator having an input terminal receiving the sensed value of the first current flowing through the first rectifying switch and an output terminal generating the weighted sensed value and a comparing device having a first input terminal receiving the weighted comparison voltage, a second input terminal receiving the weighted sensed value and an output terminal generating the weighted turn-off signal.

Preferably, the resonant converter system further includes a transformer having a primary side, wherein a current signal reflected to the primary side by the first current is sensed to generate the sensed value.

Preferably, the resonant converter system further includes a main controller, wherein the transformer further comprises a secondary side, the resonant converter is a DC/DC full-bridge LLC resonant converter comprising the transformer, an LLC resonant tank and a full-bridge switching circuit coupled to the LLC resonant tank and the primary side, the main controller generates a first and a second driving signals to drive the full-bridge switching circuit and the rectifying device is a full-wave rectifier and is coupled to the secondary side.

Preferably, the full-wave rectifier further includes a second rectifying switch, the LLC resonant tank includes a resonant inductor coupled to the full-bridge switching circuit, a resonant capacitor coupled to the resonant inductor and an magnetizing inductor coupled to the resonant capacitor and the primary side, and the synchronous rectifying control circuit further includes a current transformer (CT) coupled to the transformer and sensing the current signal reflected to the primary side by the first current, a sensed current value generator coupled to the CT and receiving the current signal for generating the sensed value of the first current, a peak current value generator coupled to the CT and receiving the current signal for generating the reflection signal, a reference voltage generator generating the reference voltage, a minimum pulse generation apparatus receiving the first driving signal for generating a first minimum pulse signal, a trigger apparatus receiving the weighted turn-off signal and the first and minimum pulse signal for generating a first output signal, a first driver receiving the first output signal for driving the first rectifying switch accordingly.

Preferably, the minimum pulse generation apparatus includes a first minimum pulse generator receiving the first driving signal for generating the first minimum pulse signal wherein the trigger apparatus includes a first trigger circuit receiving the first minimum pulse signal and the weighted turn-off signal for generating the first output signal.

Preferably, the full-bridge switching circuit includes a first to a fourth switches, the first driving signal drives the first and the fourth switches and the second driving signal drives the second and the third switches.

Preferably, the first weight generator is a potentiometer, the second weight generator is a lead sending the sensed value to the second input terminal of the comparing device directly, and the weighted sensed value equals to the sensed value.

Preferably, the signal generation apparatus includes a first weight generator having a first input terminal receiving the reference voltage, a second input terminal receiving the sensed value of the first current flowing through the first rectifying switch and an output terminal generating a weighted comparison voltage, wherein the weighted comparison voltage is a weighted sum of the reference voltage and the sensed value, a second weight generator having an input terminal receiving the reflection signal reflecting the peak value of the first current and an output terminal generating the weighted reflection signal and a comparing device having a first input terminal receiving the weighted comparison voltage, a second input terminal receiving the weighted reflection signal and an output terminal generating the weighted turn-off signal.

Preferably, the signal generation apparatus includes a first weight generator having a first input terminal receiving the reflection signal, a second input terminal receiving the sensed value and an output terminal generating a weighted comparison voltage, wherein the weighted comparison voltage is a weighted sum of the reflection signal and the sensed value, a second weight generator having an input terminal receiving the reference voltage and an output terminal generating a weighted reference voltage and a comparing device having a first input terminal receiving the weighted comparison voltage, a second input terminal receiving the weighted reference voltage and an output terminal generating the weighted turn-off signal.

Preferably, the sensed value is generated via measuring a voltage across two terminals of the first rectifying switch.

Preferably, the resonant converter system further includes a main controller, wherein the weighted reference voltage represents a turn-off comparison threshold value of the first rectifying switch, the resonant converter is a DC/DC full-bridge LLC resonant converter including a full-bridge switching circuit having a first to a fourth switching switches, a transformer having a primary and a secondary sides and an LLC resonant tank including a resonant inductor coupled to the full-bridge switching circuit, a resonant capacitor coupled to the resonant inductor and a magnetizing inductor coupled to the resonant capacitor and the primary side, the main controller generates a first driving signal driving the first and the fourth switching switches and a second driving signal driving the second and the third switching switches, a switching frequency of the first to the fourth switching switches is changed to modulate an AC output voltage of the full-bridge switching circuit, the rectifying device is a full-wave rectifier further including a second rectifying switch and coupled to the secondary side, and the synchronous rectifying control circuit further includes a current transformer (CT) coupled to the transformer for sensing a current signal reflected to the primary side by the first current, a voltage sensor coupled to the first rectifying switch for generating the voltage across the two terminals of the first rectifying switch, a peak current value generator coupled to the CT for generating the reflection signal, a synchronous rectifying signal generation circuit receiving the weighted turn-off signal for generating a synchronous rectifying signal and a first driver receiving the synchronous rectifying signal for driving the first rectifying switch accordingly.

According to the second aspect of the present invention, a controlling method for a resonant converter system, wherein the resonant converter system includes a first rectifying switch, includes a step of: (a) generating a weighted turn-off signal to turn off the first rectifying switch, wherein the weighted turn-off signal is generated by weighting and comparing a sensed value of a first current flowing through the first rectifying switch, a reflection signal reflecting a peak value of the first current and a reference voltage.

Preferably, the resonant converter system further includes a rectifying device having the first rectifying switch and a synchronous rectification control circuit having a signal generation apparatus coupled to the rectifying device, and the weighted turn-off signal is generated by the signal generation apparatus and used to turn off the first rectifying switch at a zero crossing point of the first current flowing through the first rectifying switch.

Preferably, the resonant converter system further includes a transformer having a primary side, the synchronous rectifying control circuit further includes a current transformer (CT), a sensed current value generator, a peak current value generator and a reference voltage generator, and the step (a) further includes steps of: (a1) sensing a current signal reflected to the primary side by the first current via the CT; (a2) receiving the current signal by the sensed current value generator for generating the sensed value; (a3) receiving the current signal by the peak current value generator for generating the reflection signal; (a4) generating the reference voltage by the reference voltage generator; (a5) generating a weighted comparison voltage which is a weighted sum of the reflection signal and the reference voltage; (a6) generating a weighted reflection signal through the reflection signal; and (a7) comparing the weighted sensed value with the weighted comparison voltage to generate the weighted turn-off signal.

Preferably, the resonant converter system further includes a main controller and a switching circuit, the main controller generate a first and a second driving signals to drive the switching circuit, the synchronous rectifying control circuit further includes a trigger apparatus, a logic interlock circuit and a first driver, and the step (a) further includes steps of: (a8) receiving the first driving signal and the weighted turn-off signal via the trigger apparatus for generating the first output signal; (a9) receiving the first output signal via the logic interlock circuit for generating the synchronous rectifying signal; and (a10) receiving the synchronous rectifying signal via the first driver for driving the first rectifying switch accordingly.

Preferably, the resonant converter system further includes a transformer, the synchronous rectifying control circuit further includes a current transformer (CT), a sensed current value generator, a peak current value generator and a reference voltage generator, and the step (a) further includes steps of: (a1) sensing a current signal reflected to the primary side by the first current via the CT; (a2) receiving the current signal via the sensed current value generator for generating the sensed value; (a3) receiving the current signal via the peak current value generator for generating the reflection signal; (a4) generating the reference voltage via the reference voltage generator; (a5) generating a weighted comparison voltage which is a weighted sum of the sensed value and the reference voltage; (a6) generating a weighted reflection signal through the reflection signal; and (a7) comparing the weighted reflection signal with the weighted comparison voltage to generate the weighted turn-off signal.

Preferably, the resonant converter system further includes a transformer, the synchronous rectifying control circuit further includes a current transformer (CT), a peak current value generator, a voltage sensor coupled to the first rectifying switch and a reference voltage generator, and the step (a) further includes steps of: (a1) sensing a current signal reflected to the primary side by the first current via the CT; (a2) receiving the current signal via the peak current value generator for generating the reflection signal; (a3) generating the sensed value of the first current via the voltage sensor; and (a4) generating the reference voltage via the reference voltage generator; (a5) generating a weighted comparison voltage which is a weighted sum of the sensed value and the reflection signal; (a6) generating a weighted reference voltage through the reference voltage; and (a7) comparing a weighted comparison voltage with the weighted reference voltage via the signal generation apparatus so as to generate the weighted turn-off signal.

Preferably, the weighted reference voltage is a first threshold value, the signal generation apparatus includes a comparator having a first input terminal receiving the first threshold value, a second input terminal receiving a second threshold value, a third input terminal receiving the weighted comparison voltage and an output terminal generating the weighted turn-off signal, the first threshold value is a turn-off comparison threshold value of the first rectifying switch, and the second threshold value is a turn-on comparison threshold value of the first rectifying switch.

The present invention may best be understood through the following descriptions with reference to the accompanying drawings, in which:

DETAILED DESCRIPTION OF THE PREFERRED EMBODIMENT

A DC/DC full-bridge LLC resonant converter among various resonant converters is employed as an example to describe the resonant converter system and the controlling method thereof proposed in the present invention. And the controlling method can be used in other resonant converters e.g. series resonant converter, parallel resonant converter etc.

Figure 1:
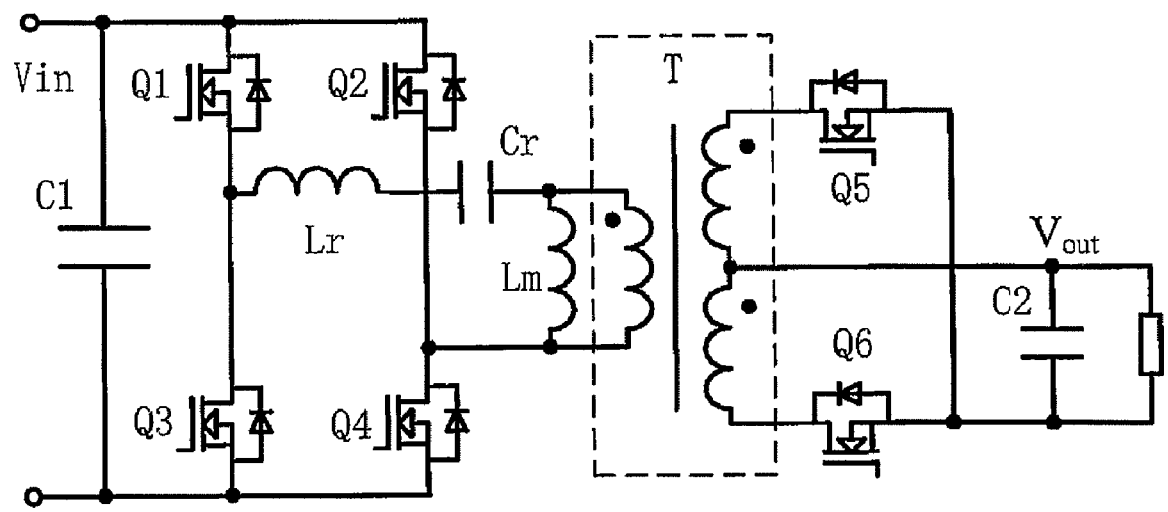
FIG. 1 shows a circuit diagram of a DC/DC full-bridge LLC resonant converter in the prior art.
Figure 2:
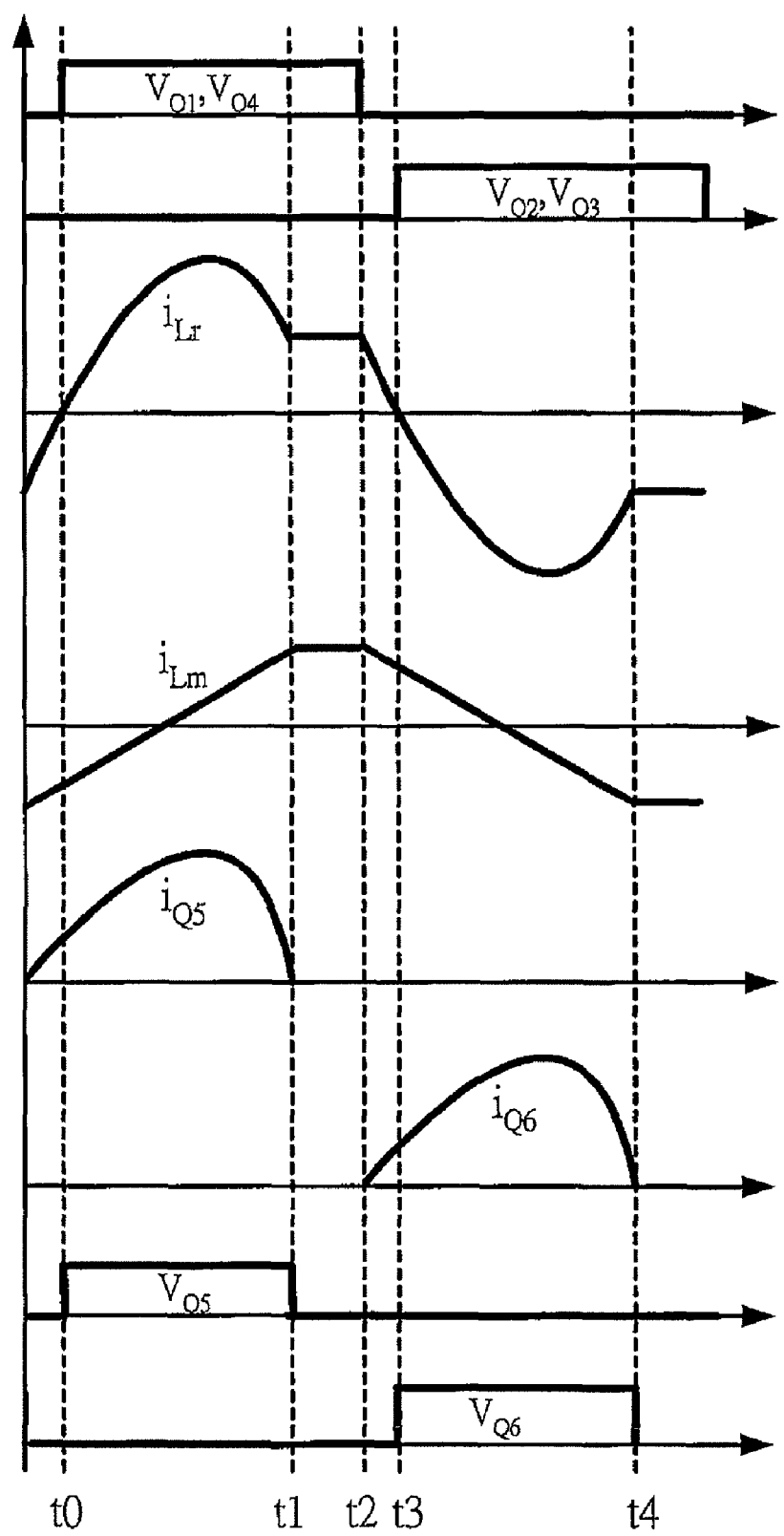
FIG. 2 shows a main operating waveforms of a DC/DC full-bridge LLC resonant converter as shown in FIG. 1.
Figure 3:
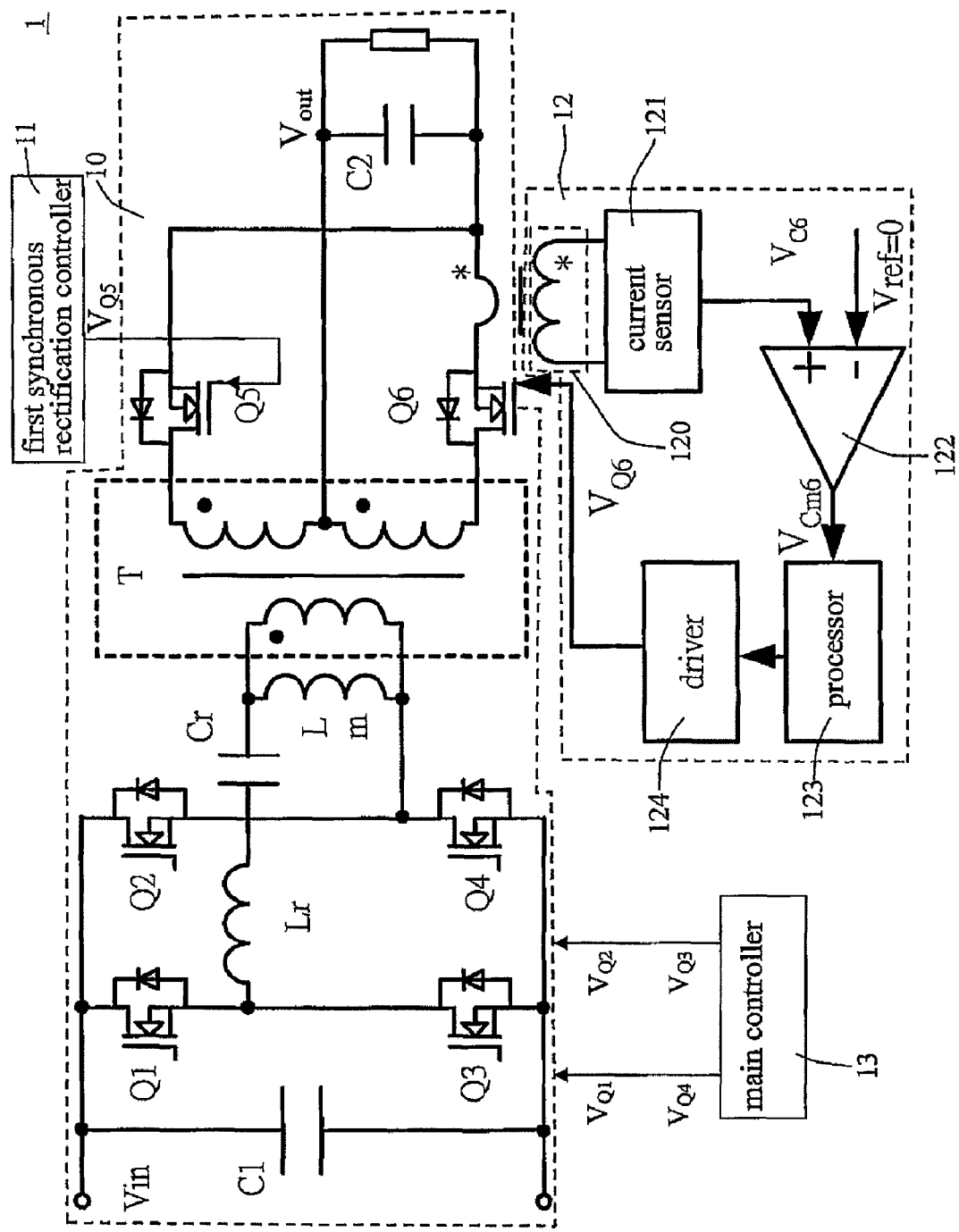
FIG. 3 shows a schematic circuit diagram of a DC/DC full-bridge LLC resonant converter having a synchronous rectification controller in the prior art.
Figure 4:
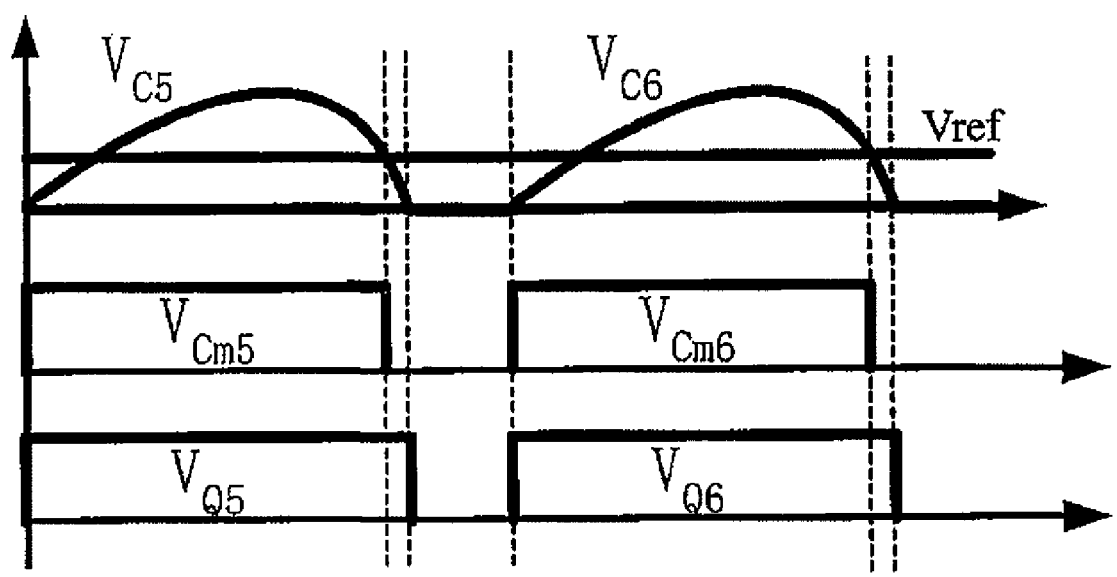
FIG. 4 shows corresponding waveforms of the resonant converter system in FIG. 3.
Figure 5:
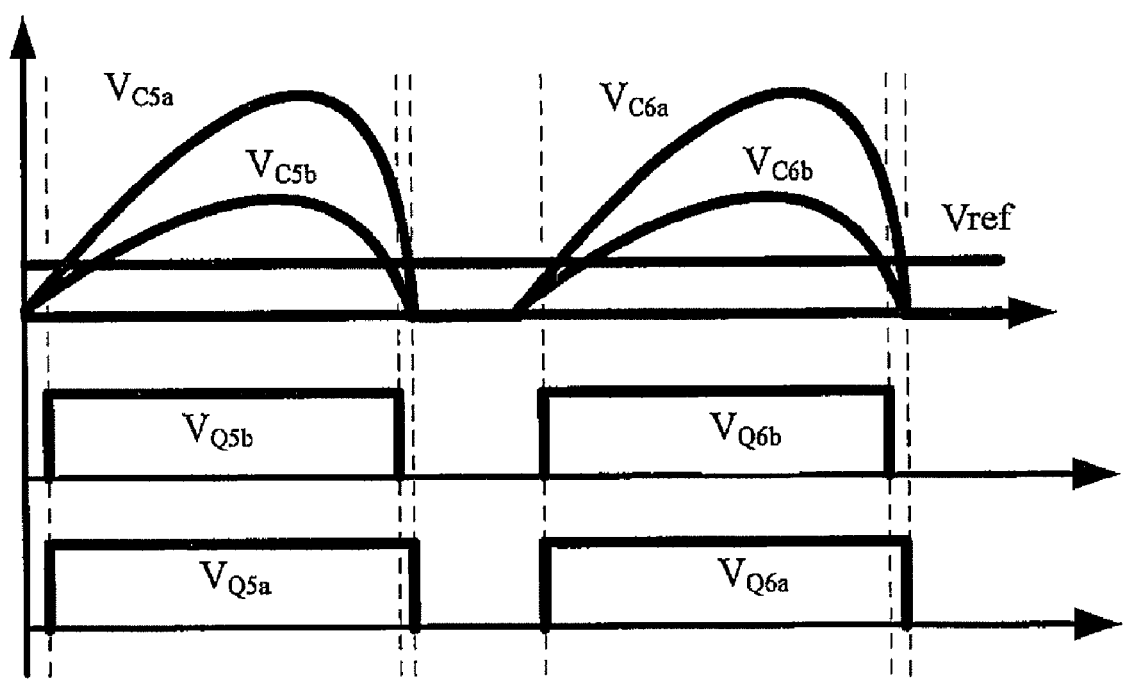
FIG. 5 shows a sensed waveform diagram of the zero-crossings of the rectifying switches' currents of the resonant converter system as shown in FIG. 3, which has a time-delay problem caused by using a fixed threshold value to compare for different loading conditions.
Figure 6A:
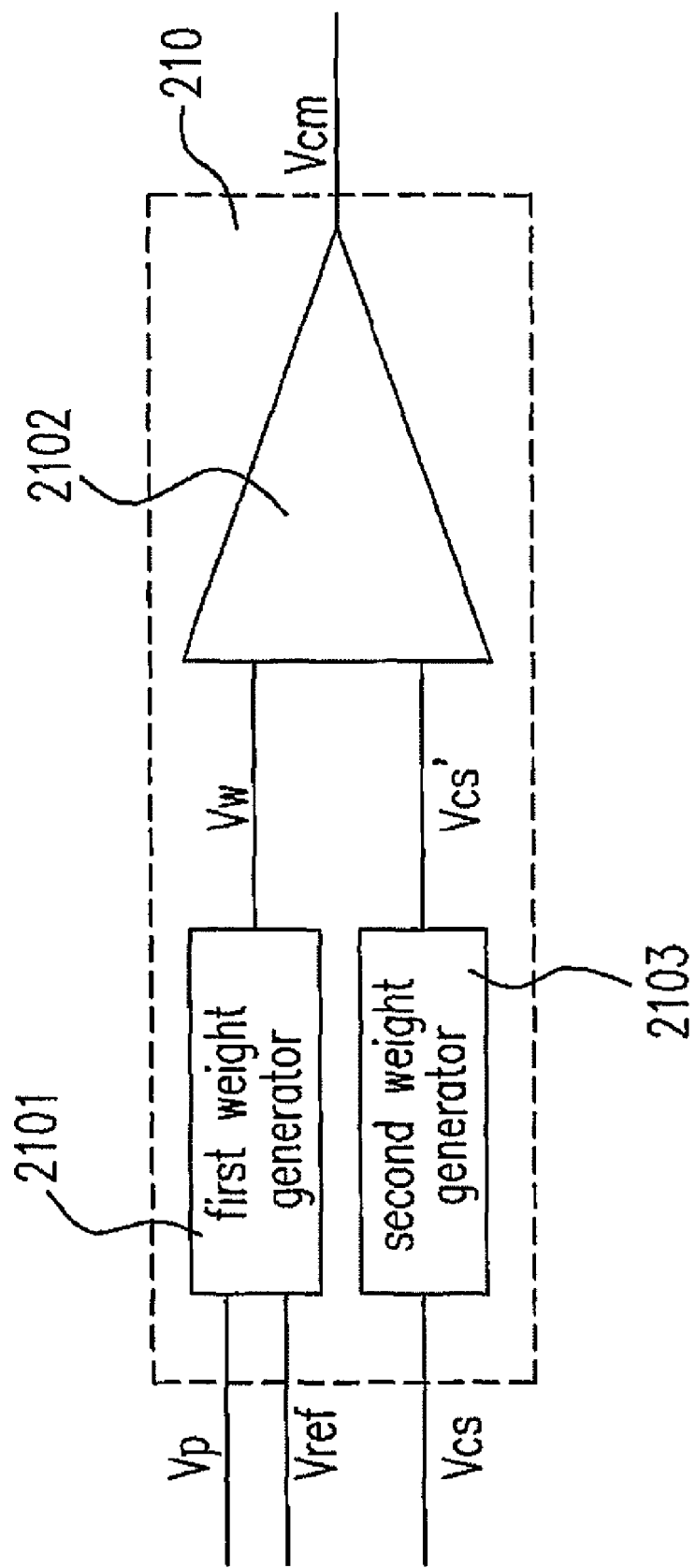
FIGS. 6(a)-6(c) shows a schematic circuit diagram of a signal generation apparatus according to the first to the third preferred embodiments of the present invention respectively.
Figure 6B:
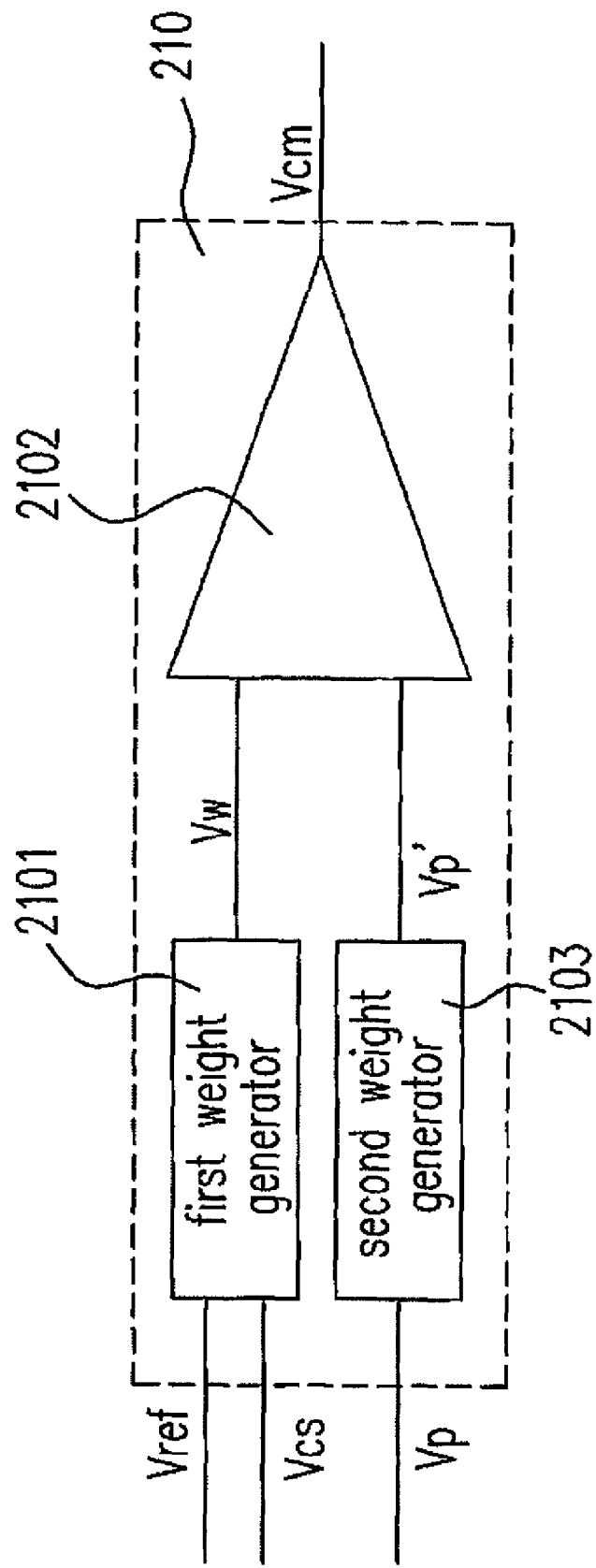
Figure 6C:
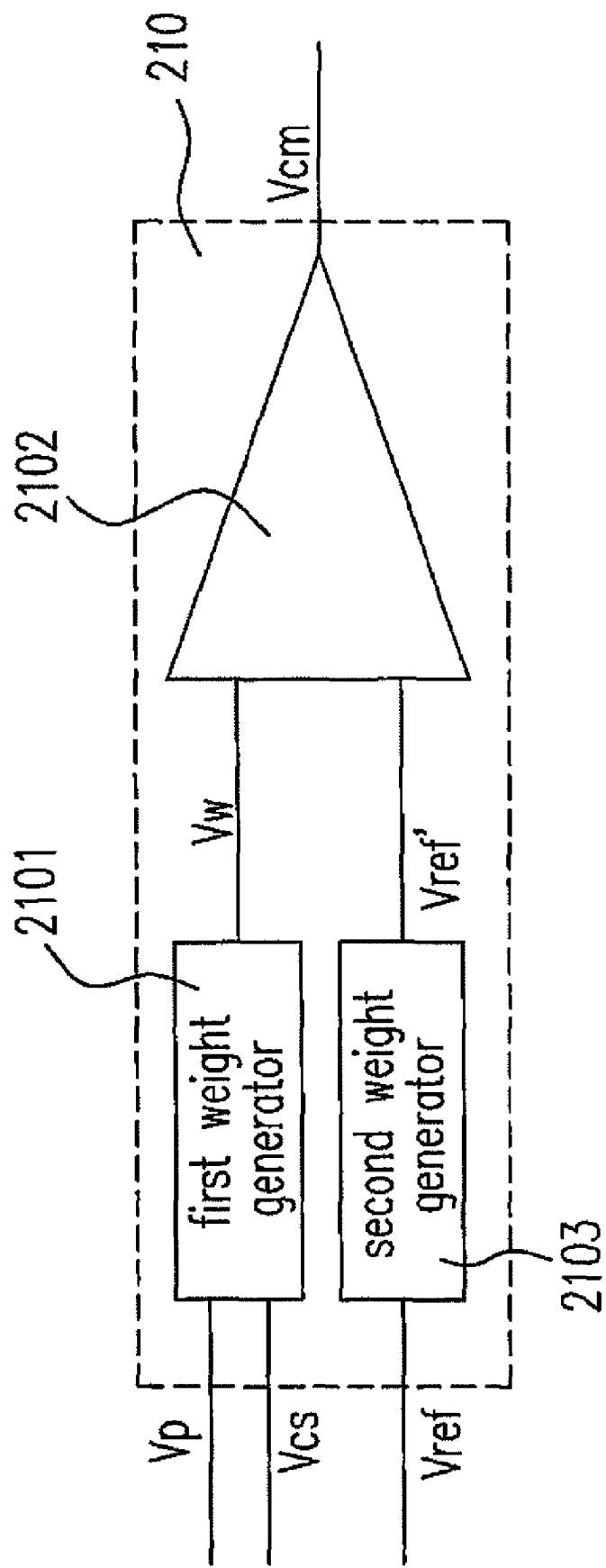

Please refer to FIGS. 6(a)-6(c), it shows the basic principle of the present invention, which is that a reflection signal Vp representing the peak value of the turn-on current of a synchronous rectifying switch, a reference voltage Vref and a current sensed signal Vcs which represents the turn-on current of the synchronous rectifying switch are weighted and compared with each other to get a weighted turn-off signal Vcm of the synchronous rectifying switch. In FIG. 6(a), it is a schematic circuit diagram of a signal generation apparatus 210 according to the first preferred embodiment of the present invention. The signal generation apparatus 210 includes a first weight generator 2101, a comparing device (e.g., a comparator) 2102 and a second weight generator 2103. The current sensed signal Vcs is weighted by the second weight generator 2103 to get a signal Vcs', i.e. Vcs'=k1*Vcs, wherein k1 is the weight value, and k1 could be any real numbers. Thus, the amplitude and polarity of the weighted sensed value Vcs' could be varied after the current sensed signal Vcs is weighted by the second weight generator 2103, and certainly they could also be kept unchanged with k1=1. When k1=1, the second weight generator 2103 could be a lead for sending the Vcs directly to a second input terminal of the comparator 2102. The reference voltage value Vref and the signal Vp are weighted by the first weight generator 2101 to get a sum, which is the weighted comparison voltage Vw, i.e. Vw=k2*Vref+k3*Vp, wherein k2 and k3 are weight values, and k2 and k3 could be any real numbers. The weighted turn-off signal Vcm is generated via a comparator 2102 after comparing Vcs' with Vw. FIG. 6(b) is a schematic circuit diagram of the signal generation apparatus 210 according to the second preferred embodiment of the present invention. The signal generation apparatus 210 includes a first weight generator 2101, a comparator 2102 and a second weight generator 2103. The current sensed signal Vcs and the reference voltage value Vref are weighted by the first weight generator 2101 to get a sum, which is the weighted comparison voltage Vw, and Vw is compared with the signal Vp', which is generated after the signal Vp is weighted by the second weight generator 2103, so as to generate the weighted turn-off signal Vcm. FIG. 6(c) shows a schematic circuit diagram of the signal generation apparatus 210 according to the third preferred embodiment of the present invention. The signal generation apparatus 210 includes a first weight generator 2101, a comparator 2102 and a second weight generator 2103. The signal Vp and the current sensed signal Vcs are weighted by the first weight generator 2101 to get a sum, which is the weighted comparison voltage value Vw, and then Vw is compared with the weighted reference voltage Vref', which is generated after the reference voltage Vref is weighted by the second weight generator 2103, so as to generate the weighted turn-off signal Vcm. The controlling methods provided by the above-mentioned three preferred embodiments of the present invention could effectively resolve the problem regarding the inconsistency among different falling edges of the driving signal for different loading conditions described in the prior art.

Figure 7:
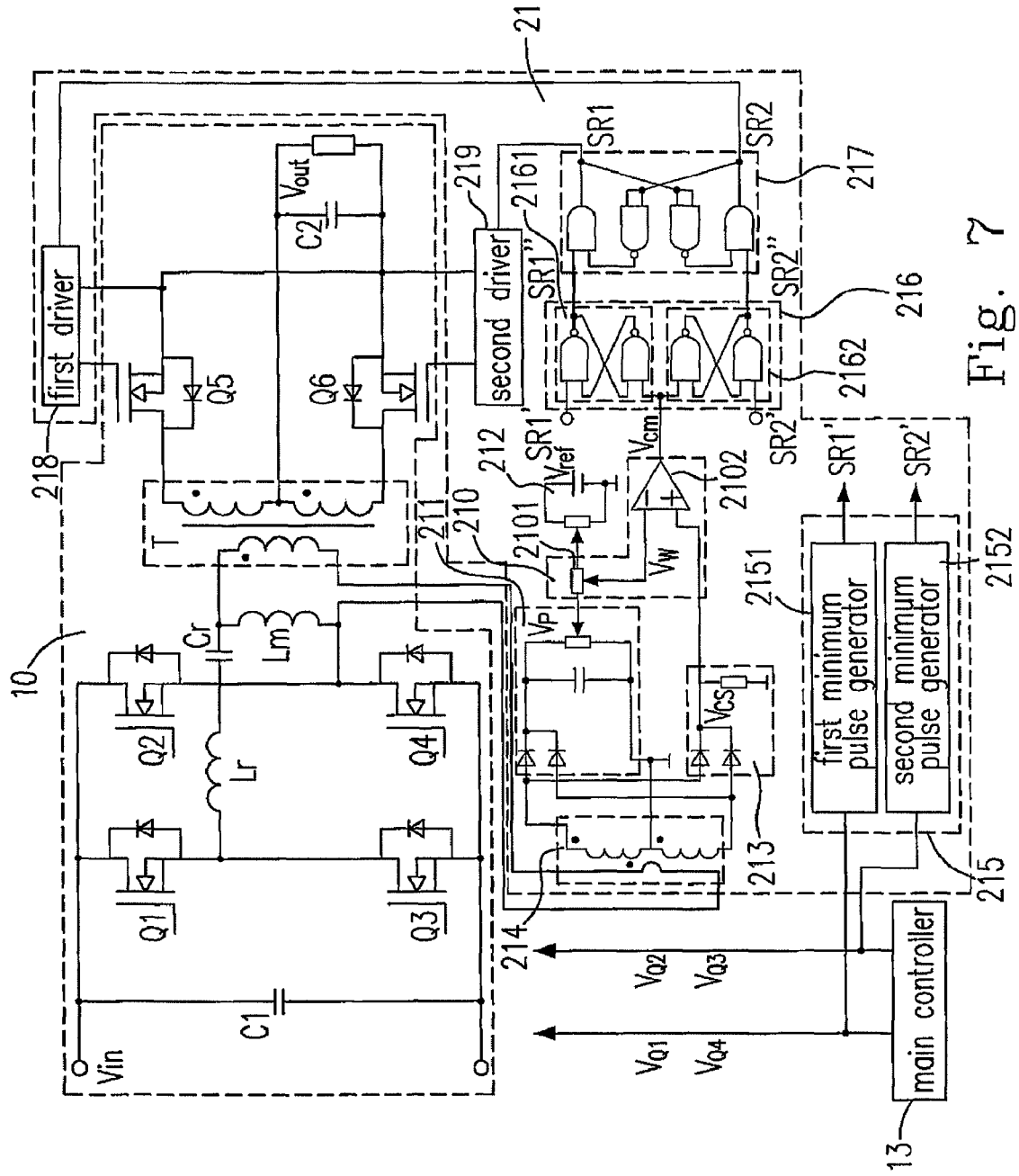
FIG. 7 shows a schematic circuit diagram of a DC/DC full-bridge LLC resonant converter system having a synchronous rectifying control circuit according to the first preferred embodiment of the present invention.

FIG. 7 is a schematic circuit diagram of a DC/DC full-bridge LLC resonant converter system 2 having a synchronous rectification control circuit using the controlling method according to the first preferred embodiment of the present invention. In which, it includes a DC/DC full-bridge LLC resonant converter 10 having a resonant tank with a resonant inductor Lr, a resonant capacitor Cr and an magnetizing inductor Lm, wherein the three elements are coupled to each other in series, the main controller 13 for generating a first driving signal (which includes gate driving signals $V_{Q1}$ and $V_{Q4}$) and a second driving signal (which includes gate driving signals $V_{Q2}$ and $V_{Q3}$) and a synchronous rectification control circuit 21. The synchronous rectification control circuit 21 includes the signal generation apparatus 210 (it includes a first weight generator 2101, a comparator 2102 and a second weight generator 2103. In FIG. 7, the first weight generator 2101 is a potentiometer for generating the weighted comparison voltage Vw; the unmarked second weight generator 2103 is the aforementioned lead which sends Vcs directly to the second input terminal of the comparator 2102; the signal generation apparatus 210 is used to generate the weighted turn-off signal Vcm); a peak current value generator 211 which includes two diodes, an energy storage capacitor and a resistor for generating a reflection signal Vp representing the peak value of the turn-on current of the synchronous rectifying switch Q6; a reference voltage generator 212 which includes a DC power source and a resistor for providing a reference voltage Vref; a current sensed signal generator 213 which includes two diodes and a resistor for generating a current sensed signal Vcs representing the turn-on current of the synchronous rectifying switch Q6; a CT 214; a minimum pulse generation apparatus 215 which includes a first minimum pulse generator 2151 receiving the first driving signal for generating a first minimum pulse signal SR1' and a second minimum pulse generator 2152 receiving the second driving signal for generating a second minimum pulse signal SR2'; a trigger apparatus 216 which includes a first trigger circuit 2161 having two NAND Gates and a second trigger circuit 2162 having two NAND Gates for generating a first and a second output signals SR1" and SR2"; a logic interlock circuit 217 which includes two NAND Gates and two AND Gates for generating a first and a second synchronous rectifying signals SR1 and SR2; a first driver 218 receiving the second synchronous rectifying signal SR2 to drive the synchronous rectifying switch Q5 and a second driver 219 receiving the first synchronous rectifying signal SR1 to drive the synchronous rectifying switch Q6.

Figure 8:
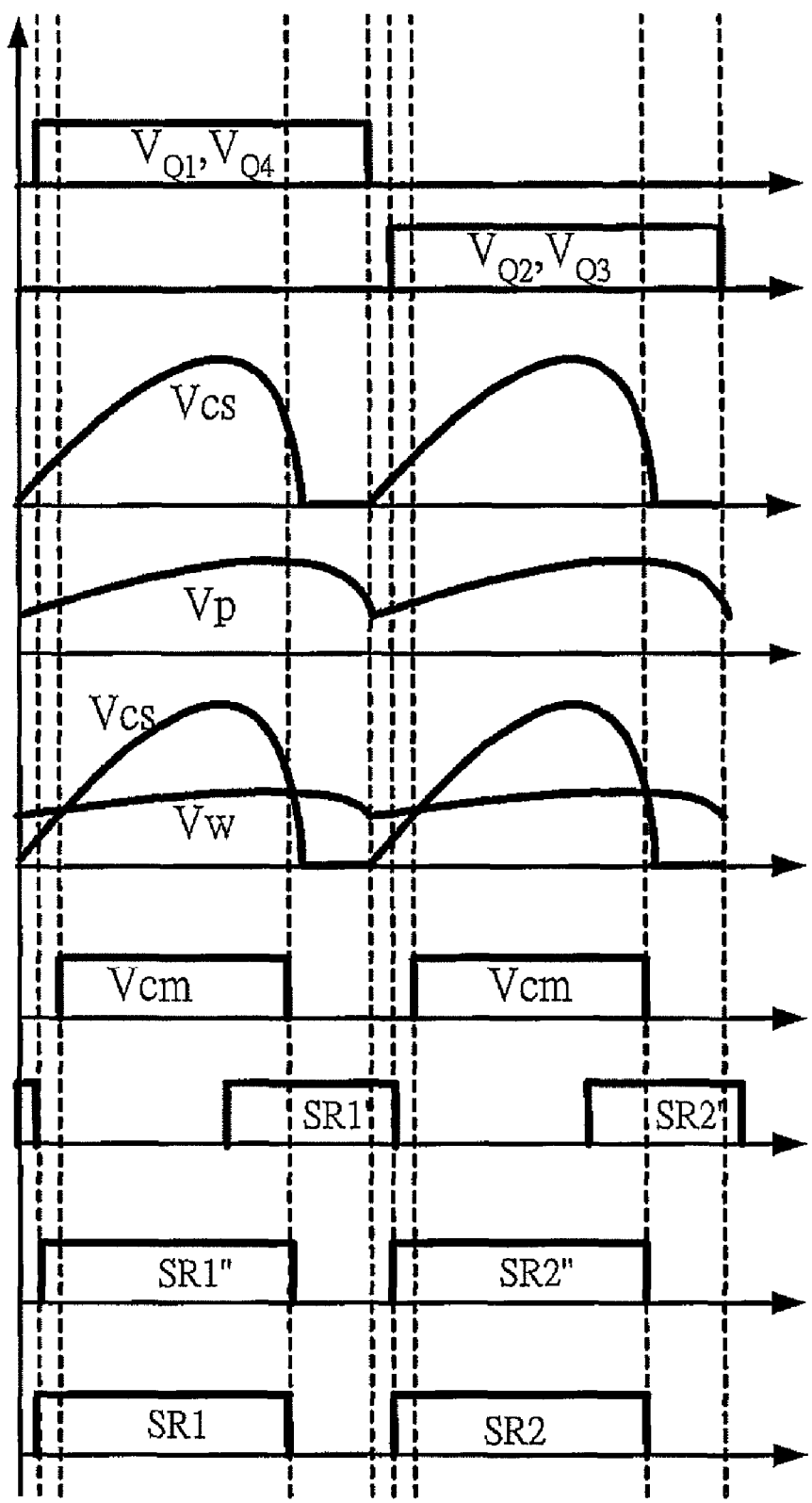
FIG. 8 shows a main working waveform diagram of the synchronous rectifying control circuit according to the first preferred embodiment of the present invention.
Figure 9:
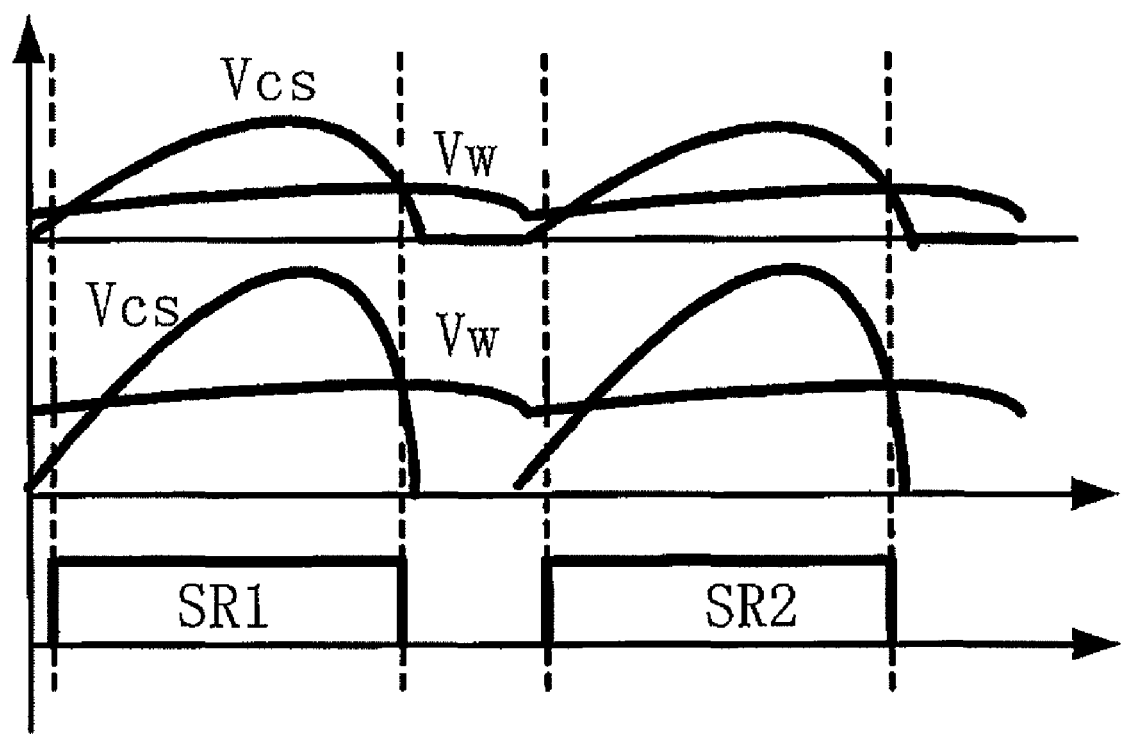
FIG. 9 shows a sensed waveform diagram having zero-crossings of the rectifying switches' currents of the resonant converter system as shown in FIG. 7, which is obtained by using various threshold values to compare for different loading conditions.

In the DC/DC full-bridge LLC resonant converter system 2, the duty ratio of the gate driving signals $V_{Q1}$-$V_{Q4}$ of the four switches Q1-Q4 at the primary side of the transformer T is fixed approximate to 50%, the main controller 13 employs a frequency variation method to control the four switches Q1-Q4 so as to modulate the output voltage of the switching circuit, and the synchronous rectifying signals SR1 and SR2 of the synchronous rectifying switches Q5/Q6 at the secondary side of the transformer T are generated via sensing the zero crossings of the current at the secondary side of the transformer T. And the transformer T is electrically connected to the magnetizing inductor Lm in parallel, wherein the transformer T is manufactured as an ideal transformer to transfer energy to the secondary side, and the CT 214 is electrically connected in series with the primary winding of the transformer T for sensing a current signal which represents the current of the synchronous rectifying switches Q5-Q6 at the secondary side of the transformer. The secondary winding of the CT 214 employs a central tap structure, the sensed value Vcs is gotten via the current sensed signal generator 213, and the reflection signal Vp representing the peak value of the turn-on current of the synchronous rectifying switch Q5/Q6 is gotten via the peak current value generator 211. FIG. 8 shows the waveforms of the current sensed signal Vcs and the reflection signal Vp. The DC power source of the reference voltage generator 212 provides a reference voltage Vref. Vref and Vp are divided and weighted via the potentiometer 2101 to get the weighted comparison voltage Vw. The weighted comparison voltage Vw compares with the weighted value Vcs' of the sensed value Vcs (here Vcs'=Vcs) via the comparator 2102 to get the weighted turn-off signal Vcm which is a pulse signal. Since the weighted comparison voltage Vw is not zero, the falling edge of the turn-off signal of the weighted turn-off signal Vcm is a little bit earlier than the zero crossing of the sensed value Vcs for a certain time. And the relative waveforms of the above-mentioned first driving signal ($V_{Q1}$ and $V_{Q4}$), the second driving signal ($V_{Q2}$ and $V_{Q3}$), SR1', SR2', SR1", SR2", SR1 and SR2 are also shown. Since the weighted comparison voltage Vw is generated by the sum of the weighted reflection signal Vp and the weighted reference Vref, the weighted comparison voltage Vw can be self-adjusted under different load current conditions. As shown in FIG. 9, Vcs at the upper side is the current sampling signal under the light load and Vw at the upper side is the corresponding weighted comparison voltage; Vcs at the lower side is the current sampling signal under the heavy load and Vw at the lower side is the corresponding weighted comparison voltage. And it also shows that the falling edges of SR1 and SR2 at the light load and the heavy load conditions are overlapped. Since the weighted comparison voltage Vw is correspondingly modulated under different load conditions, the interval between the falling edges of the weighted turn-off signal Vcm under different load conditions and the zero current crossing points of the rectifying switches keeps almost constant. And the interval can be adjusted by modulating the weight of the weighted comparison voltage Vw.

After the weighted turn-off signal Vcm is obtained, it is sent to the trigger apparatus 216, which includes a first and a second trigger circuit 2161 and 2162. The first and the second trigger circuit 2161 and 2162 are RS trigger circuits effective to the low voltage value, which includes two NAND Gates and two inputs. One input of the first trigger circuit 2161 is the weighted turn-off signal Vcm, the other input of the first trigger circuit 2161 is SR1' signal; one input of the second trigger circuit 2162 is the weighted turn-off signal Vcm, and the other input is SR2' signal. SR1' and SR2' are the first and the second minimum pulse signals generated by the minimum pulse generation apparatus 215, which receives the first and the second driving signals generated by the main controller 13 at the primary side of the transformer T. As shown in FIG. 8, the logic of the first and the second minimum pulse signals SR1' and SR2' is to change from the high level to the low level at the rising edge of the pulse of the first driving signal ($V_{Q1}$ and $V_{Q4}$) and the second driving signal ($V_{Q2}$ and $V_{Q3}$), and change from the low level to the high level again after a fixed time period. When SR2' and SR1' changes from the high level to the low level, the first and the second output signals SR1" and SR2" are forced to stay at the high level until the weighted turn-off signal Vcm changes to the low level. And if the weighted turn-off signal Vcm is already at the low level, the first and the second output signals SR1" and SR2" will immediately switch to the low level when first and the second minimum pulse signals SR1' and SR2' change from the low level to the high level. When the weighted turn-off signal Vcm switches to the low level, the first and the second output signals SR1" and SR2" would be kept at the low power level unchanged until the next time when SR1' and SR2' change from the high level to the low level, then SR1" and SR2" change to the high level.

Therefore, due to the participation of the trigger apparatus 216 and the first and the second minimum pulse signals SR1' and SR2', the first and the second output signals SR1" and SR2" are guaranteed to change from the low level to the high level at the rising edges of the first driving signal ($V_{Q1}$ and $V_{Q4}$)/the second driving signal ($V_{Q2}$ and $V_{Q3}$) and to change from the high level to the low level at the zero crossing point of the current of the synchronous rectifying switches (Q5/Q6). And at the same time, if the current sampling signal (sensed value) Vcs can not be compared with the weighted comparison voltage Vw under one of an extra light load and no load conditions, the first and the second synchronous rectifying signals SR1 and SR2 will have the minimum pulse-width. The trigger apparatus 216 could alleviate the error due to the jitter of the current sampling signals (sensed value).

Figure 10:
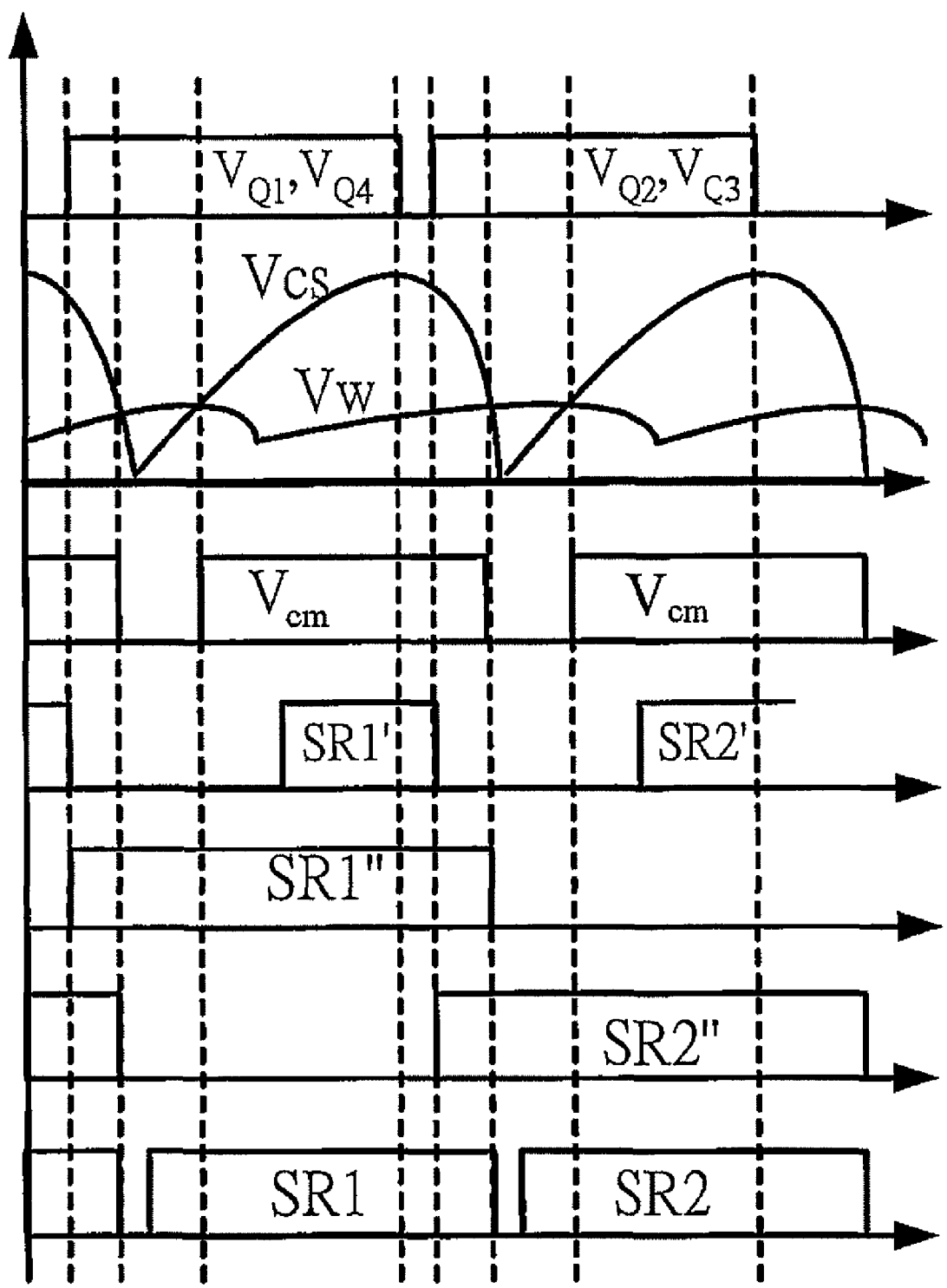
FIG. 10 shows a main working waveform diagram of the synchronous rectifying control circuit of the resonant converter system as shown in FIG. 7 when the working frequency is higher than the resonant frequency.

The first and the second output signals SR1" and SR2" further go through the logic interlock circuit 217, which could prevent the switches Q5 and Q6 from shoot-through, and would guarantee the normal operation of the synchronous rectifier when the operating frequency of the first driving signal ($V_{Q1}$ and $V_{Q4}$) and the second driving signal ($V_{Q2}$ and $V_{Q3}$) of the switches Q1-Q4 are higher than the resonant frequency of the resonant inductor Lr and the resonant capacitor Cr. FIG. 10 shows the operating waveforms when the operating frequency is higher than the resonant frequency of Lr and Cr. Vcs is the current sensed signal, and Vw is the corresponding weighted comparison voltage. This is different from the normal operations that the sensed value Vcs lags to the first driving signal ($V_{Q1}$ and $V_{Q4}$)/the second driving signal ($V_{Q2}$ and $V_{Q3}$) of the switches Q1-Q4 due to the high operating frequency. Therefore, if the first and the second output signals SR1" and SR2" change from low level to high level at the rising edges of the first driving signal ($V_{Q1}$ and $V_{Q4}$)/the second driving signal ($V_{Q2}$ and $V_{Q3}$) and jump from high level to low level at the zero crossing point of the current of Q5/Q6, then there are overlapped areas between the first and the second output signals SR1" and SR2". And it will cause the damage of the circuit due to the shoot through of switches Q5 and Q6 when SR1" and SR2" are directly used to drive Q5 and Q6. If the first synchronous rectifying signal SR1 is still at the high level after going through the logic interlock circuit 217, the second synchronous rectifying signal SR2 will be forced to stay at the low level until SR1 changes to the low level since SR2 is a result of taking the NOT operation of the first output signal SR1 firstly and then taking the AND operation for the inverted first output signal SR1 and the second output signal SR2". Thus, there will be no overlapped area between the first and the second synchronous rectifying signals SR1 and SR2, and the normal time sequence of the synchronous rectifier is guaranteed. The first and the second synchronous rectifying signals SR1 and SR2 are sent through the second and the first drivers 219 and 218 so as to directly drive the synchronous rectifying switches Q5 and Q6.

Figure 11:
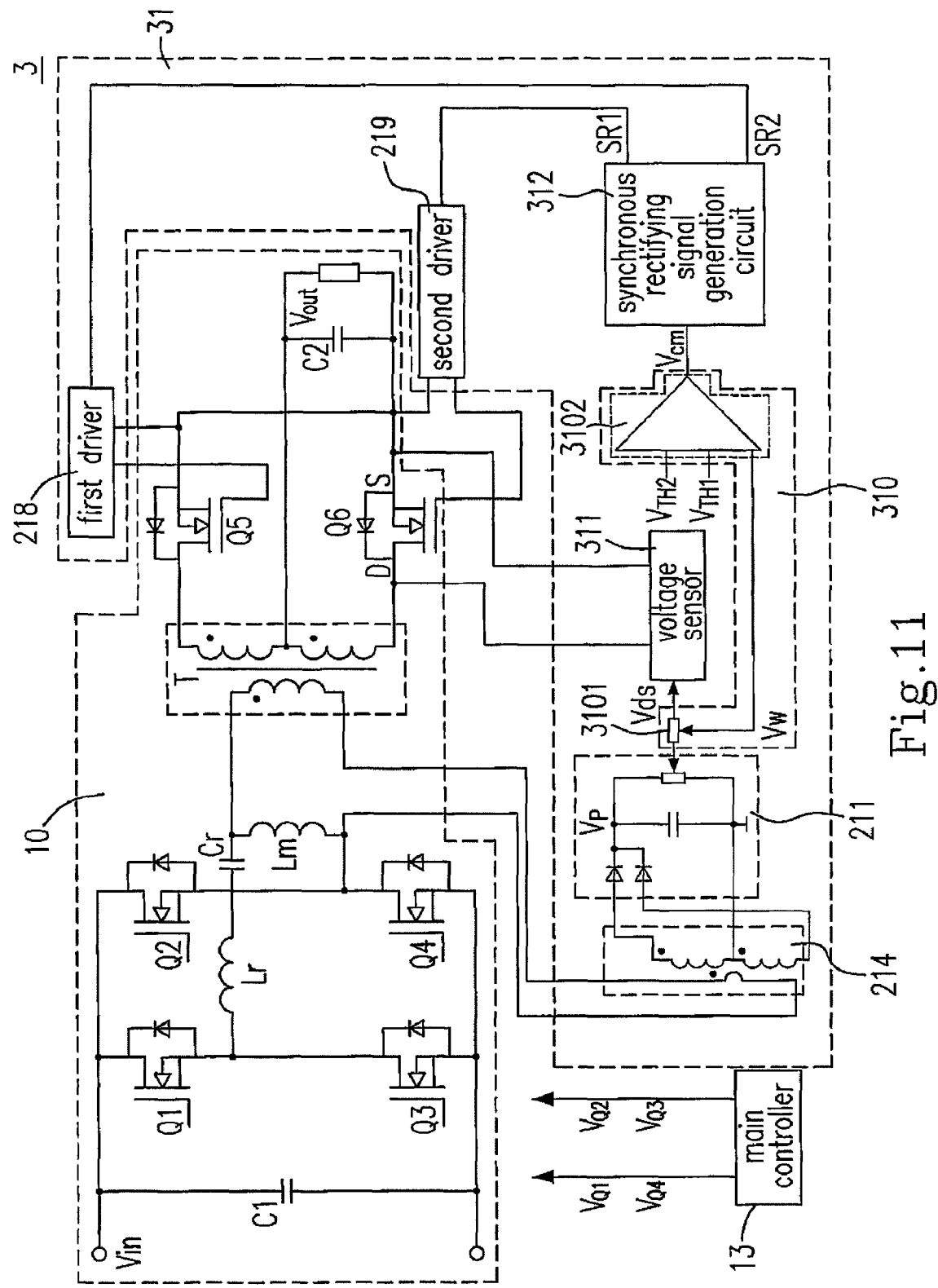
FIG. 11 shows a schematic circuit diagram of a DC/DC full-bridge LLC resonant converter system having a synchronous rectifying control circuit according to the third preferred embodiment of the present invention.

From the above-mentioned preferred embodiment, it shows an alternative by sampling of the current at the primary side of the transformer T to drive the synchronous rectifying switch. As aforementioned, sampling the voltage across the two terminals of a synchronous rectifying switch Q5/Q6 could also reflect the current flowing through the synchronous rectifying switch Q5/Q6, and this sampling alternative is applied by many vendors for generating the synchronous rectification control chips. As shown in FIG. 11, it is a schematic circuit diagram of a DC/DC full-bridge LLC resonant converter system 3 having a synchronous rectification control circuit according to the third preferred embodiment of the present invention. In which, it includes the DC/DC full-bridge LLC resonant converter 10, the main controller 13 and a synchronous rectification control circuit 31. The synchronous rectification control circuit 31 includes the signal generation apparatus 310; the peak current value generator 211 for generating the peak current value of the reflection signal Vp representing the turn-on current of the synchronous rectifying switch Q5/Q6; a voltage sensor 311 (electrically connected to the two terminals D and S of the synchronous rectifying switch Q6 for generating the sensed voltage value Vds); the CT 214; a synchronous rectifying signal generation circuit 312 (receiving the weighted turn-off signal Vcm for generating the first and the second synchronous rectifying signals SR1 and SR2); the first driver 218 and the second driver 219, wherein the signal generation apparatus 310 includes a first weight generator 3101 (e.g., a potentiometer for generating the weighted comparison voltage Vw) and a comparing device 3102 (e.g., a comparator located in a control chip according to the third preferred embodiment of the present invention and having three input terminals for receiving two threshold values $V_{TH1}$, $V_{TH2}$ and the weighted comparison voltage Vw and an output terminal for generating the weighted turn-off signal Vcm).

Figure 12:
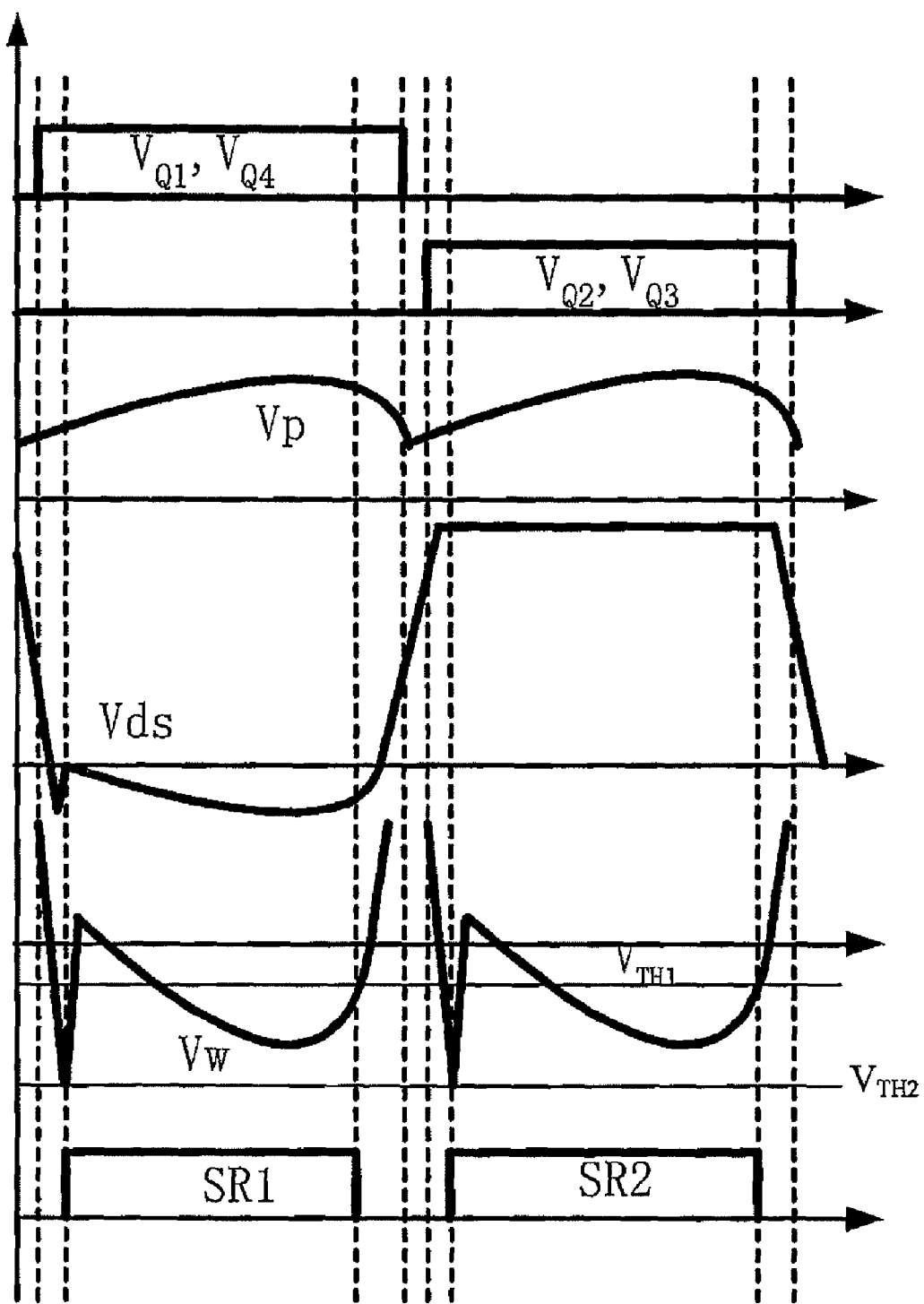
FIG. 12 shows a main working waveform diagram of the synchronous rectifying control circuit of the resonant converter system as shown in FIG. 11.

In the application as shown in FIG. 11, the CT 214 and the peak current value generator 211 are employed to get the reflection signal Vp reflecting the peak current value, and the relative sensed waveforms which are shown in FIG. 12. The voltage sensor 311 is employed to sense the voltage between the two terminals D and S so as to get the voltage signal Vds. After going through the potentiometer 3101 to add the weighted Vds with the weighted signal Vp, the newly weighted comparison voltage Vw is generated, which is sent to the input terminal of the comparator 3102. Since the voltage signal Vds is a negative value when the rectifying switch Q5/Q6 is turned on, thus the weighted comparison voltage Vw is a difference between absolute values of Vds and Vp.

In FIG. 12, Vw is the weighted comparison voltage; $V_{TH1}$ is the turn-off comparison threshold value; and $V_{TH2}$ is the turn-on comparison threshold value. In which, one of the first and the second synchronous rectifying signals SR1 and SR2 switches from a low level to a high level when the weighted comparison voltage Vw equals to the second threshold value $V_{TH2}$, and one of the first and the second synchronous rectifying signals SR1 and SR2 switches from a high level to a low level when the weighted comparison voltage Vw equals to the first threshold value $V_{TH1}$.

In FIG. 11, the falling edges of the driving signals of the synchronous rectifying switches Q5/Q6 are at the timing of the zero crossing point of their current. And the weighted comparison voltage Vw is the weighted difference of the reflection signal Vp reflecting the peak current value and the sensed voltage value Vds. As for $V_{TH2}$, it is the turn-on comparison threshold value, and is only related to the turn-on of the first and the second rectifying switches Q5/Q6. The operational principles of the signal generation apparatus 310 are the same as those of 210 in FIG. 6(c), thus FIG. 11 is a schematic circuit diagram of a DC/DC full-bridge LLC resonant converter system having a synchronous rectification control circuit according to the third preferred embodiment of the present invention. Due to the participation of the reflection signal Vp, the weighted comparison voltage Vw will follow the reflection signal Vp to change. And since the voltage across two terminals D and S, Vds varies according to the load, it guarantees that the falling edges of the first and the second synchronous rectifying signals SR1 and SR2 are located at the same timing for different load condition.

The present invention intends to protect the proposed apparatus and method thereof, which introduces the reflection signal reflecting peak current value into the current comparison procedure to get the correct falling edges of the synchronous rectifying signals.

According to the aforementioned descriptions, the present invention provides a resonant converter system having a synchronous rectifying control circuit such that via using an adaptive comparison threshold value for each different load current to make sure that the falling edge of the driving signal of the synchronous rectifying switch is at the same timing of the zero crossing point of its current at different load condition. Though the above-mentioned preferred embodiments describe that the synchronous rectifying switch is turned off at the zero crossing point of its current at different load condition, some other turning-off timing can also be adopted, e.g. the timing which is earlier than the zero crossing point for a certain period.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A resonant converter system, comprising:
   a resonant converter receiving an input voltage for outputting an output voltage and comprising a rectifying device having a first rectifying switch; and
   a synchronous rectification control circuit coupled to the resonant converter and comprising a signal generation apparatus generating a weighted turn-off signal to turn off the first rectifying switch,
   wherein the weighted turn-off signal is generated by weighting and comparing a sensed value of a first current flowing through the first rectifying switch, a reflection signal reflecting a peak value of the first current and a reference voltage.

2. A system according to claim 1, wherein the weighted turn-off signal is used to turn off the first rectifying switch at a zero crossing point of the first current.

3. A system according to claim 1, wherein the signal generation apparatus comprises:
   a first weight generator having a first input terminal receiving the reflection signal reflecting the peak value of the first current, a second input terminal receiving the reference voltage and an output terminal generating a weighted comparison voltage, wherein the weighted comparison voltage is a weighted sum of the reflection signal and the reference voltage;
   a second weight generator having an input terminal receiving the sensed value of the first current flowing through the first rectifying switch and an output terminal generating the weighted sensed value; and
   a comparing device having a first input terminal receiving the weighted comparison voltage, a second input terminal receiving the weighted sensed value and an output terminal generating the weighted turn-off signal.

4. A system according to claim 3 further comprising a transformer having a primary side and a secondary side and, wherein the rectifying device is connected to the secondary side and a current signal reflected to the primary side by the first current is sensed to generate the sensed value.

5. A system according to claim 4 further comprising a main controller, wherein the resonant converter is a DC/DC full-bridge LLC resonant converter comprising the transformer, an LLC resonant tank and a full-bridge switching circuit coupled to the LLC resonant tank and the primary side, the main controller generates a first and a second driving signals to drive the full-bridge switching circuit and the rectifying device is a full-wave rectifier and is coupled to the secondary side.

6. A system according to claim 5, wherein the full-wave rectifier further comprises a second rectifying switch, the LLC resonant tank comprises a resonant inductor coupled to the full-bridge switching circuit, a resonant capacitor connected in series with the resonant inductor and a magnetizing inductor connected in parallel with the primary side, and the synchronous rectification control circuit further comprises:
   a current transformer (CT) coupled to the transformer and sensing the current signal reflected to the primary side by the first current;
   a sensed current value generator coupled to the CT and receiving the current signal for generating the sensed value of the first current;
   a peak current value generator coupled to the CT and receiving the current signal for generating the reflection signal;
   a reference voltage generator generating the reference voltage;
   a minimum pulse generation apparatus receiving the first driving signal for generating a first minimum pulse signal;
   a trigger apparatus receiving the weighted turn-off signal and the first minimum pulse signal for generating a first output signal; and
   a first driver receiving the first output signal for driving the first rectifying switch accordingly.

7. A system according to claim 6, wherein the minimum pulse generation apparatus comprises:
   a first minimum pulse generator receiving the first driving signal for generating the first minimum pulse signal; and
   a first trigger circuit receiving the first minimum pulse signal and the weighted turn-off signal for generating the first output signal.

8. A system according to claim 5, wherein the full-bridge switching circuit comprises a first to a fourth switches, the first driving signal drives the first and the fourth switches and the second driving signal drives the second and the third switches.

9. A system according to claim 3, wherein the first weight generator is a potentiometer, the second weight generator is a lead sending the sensed value to the second input terminal of the comparing device directly so that the weighted sensed value equals to the sensed value.

10. A system according to claim 1, wherein the signal generation apparatus comprises:
    a first weight generator having a first input terminal receiving the reference voltage, a second input terminal receiving the sensed value of the first current flowing through the first rectifying switch and an output terminal generating a weighted comparison voltage, wherein the weighted comparison voltage is a weighted sum of the reference voltage and the sensed value;
    a second weight generator having an input terminal receiving the reflection signal reflecting the peak value of the first current and an output terminal generating the weighted reflection signal; and
    a comparing device having a first input terminal receiving the weighted comparison voltage, a second input terminal receiving the weighted reflection signal and an output terminal generating the weighted turn-off signal.

11. A system according to claim 1, wherein the signal generation apparatus comprises:
    a first weight generator having a first input terminal receiving the reflection signal, a second input terminal receiving the sensed value and an output terminal generating a weighted comparison voltage, wherein the weighted comparison voltage is a weighted sum of the reflection signal and the sensed value;
    a second weight generator having an input terminal receiving the reference voltage and an output terminal generating a weighted reference voltage; and
    a comparing device having a first input terminal receiving the weighted comparison voltage, a second input terminal receiving the weighted reference voltage and an output terminal generating the weighted turn-off signal.

12. A system according to claim 11, wherein the sensed value is generated via measuring a voltage across two terminals of the first rectifying switch.

13. A system according to claim 12 further comprising a main controller, wherein the weighted reference voltage represents a turn-off comparison threshold value of the first rectifying switch, the resonant converter is a DC/DC full-bridge LLC resonant converter comprising a full-bridge switching circuit having a first to a fourth switching switches, a transformer having a primary and a secondary sides and an LLC resonant tank comprising a resonant inductor coupled to the full-bridge switching circuit, a resonant capacitor coupled to the resonant inductor and a magnetizing inductor connected in parallel with the primary side, the main controller generates a first driving signal driving the first and the fourth switching switches and a second driving signal driving the second and the third switching switches, a switching frequency of the first to the fourth switching switches is changed to modulate an AC output voltage of the full-bridge switching circuit, the rectifying device is a full-wave rectifier further comprising a second rectifying switch and coupled to the secondary side, and the synchronous rectification control circuit further comprises:
- a current transformer (CT) coupled to the transformer for sensing a current signal reflected to the primary side by the first current;
- a voltage sensor coupled to the first rectifying switch for generating the voltage across the two terminals of the first rectifying switch;
- a peak current value generator coupled to the CT for generating the reflection signal;
- a synchronous rectifying signal generation circuit receiving the weighted turn-off signal for generating a synchronous rectifying signal; and
- a first driver receiving the synchronous rectifying signal for driving the first rectifying switch accordingly.

14. A controlling method for a resonant converter system, wherein the resonant converter system comprises a first rectifying switch, comprising a step of:
(a) generating a weighted turn-off signal to turn off the first rectifying switch, wherein the weighted turn-off signal is generated by weighting and comparing a sensed value of a first current flowing through the first rectifying switch, a reflection signal reflecting a peak value of the first current and a reference voltage.

15. A method according to claim 14, wherein the resonant converter system further comprises a rectifying device having the first rectifying switch and a synchronous rectification control circuit having a signal generation apparatus coupled to the rectifying device, and the weighted turn-off signal is generated by the signal generation apparatus and used to turn off the first rectifying switch at a zero crossing point of the first current flowing through the first rectifying switch.

16. A method according to claim 15, wherein the resonant converter system further comprises a transformer having a primary side, the synchronous rectification control circuit further comprises a current transformer (CT), a sensed current value generator, a peak current value generator and a reference voltage generator, and the step (a) further comprises steps of:
(a1) sensing a current signal reflected to the primary side by the first current via the CT;
(a2) receiving the current signal by the sensed current value generator for generating the sensed value;
(a3) receiving the current signal by the peak current value generator for generating the reflection signal;
(a4) generating the reference voltage by the reference voltage generator;
(a5) generating a weighted comparison voltage which is a weighted sum of the reflection signal and the reference voltage;
(a6) generating a weighted sensed value through the sensed value; and
(a7) comparing the weighted sensed value with the weighted comparison voltage to generate the weighted turn-off signal.

17. A method according to claim 16, wherein the resonant converter system further comprises a main controller and a switching circuit, the main controller generate a first and a second driving signals to drive the switching circuit, the synchronous rectification control circuit further comprises a trigger apparatus, a logic interlock circuit and a first driver, and the step (a) further comprises steps of:
(a8) receiving the first driving signal and the weighted turn-off signal via the trigger apparatus for generating a first output signal;
(a9) receiving the first output signal via the logic interlock circuit for generating a synchronous rectifying signal; and
(a10) receiving the synchronous rectifying signal via the first driver for driving the first rectifying switch accordingly.

18. A method according to claim 15, wherein the resonant converter system further comprises a transformer, the synchronous rectification control circuit further comprises a current transformer (CT), a sensed current value generator, a peak current value generator and a reference voltage generator, and the step (a) further comprises steps of:
(a1) sensing a current signal reflected to the primary side by the first current via the CT;
(a2) receiving the current signal via the sensed current value generator for generating the sensed value;
(a3) receiving the current signal via the peak current value generator for generating the reflection signal;
(a4) generating the reference voltage via the reference voltage generator;
(a5) generating a weighted comparison voltage which is a weighted sum of the sensed value and the reference voltage;
(a6) generating a weighted reflection signal through the reflection signal; and
(a7) comparing the weighted reflection signal with the weighted comparison voltage to generate the weighted turn-off signal.

19. A method according to claim 15, wherein the resonant converter system further comprises a transformer, the synchronous rectification control circuit further comprises a current transformer (CT), a peak current value generator, a voltage sensor coupled to the first rectifying switch and a reference voltage generator, and the step (a) further comprises steps of:
(a1) sensing a current signal reflected to the primary side by the first current via the CT;
(a2) receiving the current signal via the peak current value generator for generating the reflection signal;
(a3) generating the sensed value of the first current via the voltage sensor;
(a4) generating the reference voltage via the reference voltage generator;
(a5) generating a weighted comparison voltage which is a weighted sum of the sensed value and the reflection signal;

(a6) generating a weighted reference voltage through the reference voltage; and (a7) comparing a weighted comparison voltage with the weighted reference voltage via the signal generation apparatus so as to generate the weighted turn-off signal.

20. A method according to claim 19, wherein the weighted reference voltage is a first threshold value, the signal generation apparatus comprises a comparator having a first input terminal receiving the first threshold value, a second input terminal receiving a second threshold value, a third input terminal receiving the weighted comparison voltage and an output terminal generating the weighted turn-off signal, the first threshold value is a turn-off comparison threshold value of the first rectifying switch, and the second threshold value is a turn-on comparison threshold value of the first rectifying switch.

* * * * *